(12) United States Patent
Brewer

(10) Patent No.: US 11,520,718 B2
(45) Date of Patent: Dec. 6, 2022

(54) MANAGING HAZARDS IN A MEMORY CONTROLLER

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/075,365

(22) Filed: Oct. 20, 2020

(65) Prior Publication Data

US 2022/0317887 A1    Oct. 6, 2022

(51) Int. Cl.
| | |
|---|---|
| *G06F 12/00* | (2006.01) |
| *G06F 13/00* | (2006.01) |
| *G06F 13/28* | (2006.01) |
| *G06F 13/16* | (2006.01) |
| *G06F 12/0862* | (2016.01) |

(52) U.S. Cl.
CPC ...... *G06F 13/1673* (2013.01); *G06F 12/0862* (2013.01); *G06F 13/1642* (2013.01); *G06F 13/1668* (2013.01)

(58) Field of Classification Search
CPC ............. G06F 12/0862; G06F 13/1642; G06F 13/1668; G06F 13/1673
USPC .......................................... 711/153
See application file for complete search history.

(56) References Cited

U.S. PATENT DOCUMENTS

| | | | |
|---|---|---|---|
| 2005/0183082 A1* | 8/2005 | Lewites | G06F 13/105 718/1 |
| 2014/0068176 A1 | 3/2014 | Baryudin et al. | |
| 2015/0178221 A1 | 6/2015 | Damodaran et al. | |
| 2018/0188961 A1 | 7/2018 | Venkatesh et al. | |
| 2020/0201790 A1 | 6/2020 | Kovacevic et al. | |
| 2022/0147404 A1* | 5/2022 | Zheng | G06F 9/50 |

FOREIGN PATENT DOCUMENTS

KR    20200111722    9/2020

OTHER PUBLICATIONS

"International Application Serial No. PCT US2021 054727, International Search Report dated Jan. 25, 2022", 3 pgs.
"International Application Serial No. PCT US2021 054727, Written Opinion dated Jan. 25, 2022", 3 pgs.

\* cited by examiner

*Primary Examiner* — Edward J Dudek, Jr.
*Assistant Examiner* — Sidney Li
(74) *Attorney, Agent, or Firm* — Schwegman Lundberg & Woessner, P.A.

(57) ABSTRACT

Devices and techniques for managing hazards in a memory controller are described herein. The memory controller can receive a memory request that includes a base memory address. An index can be computed from the base memory address and a lookup, using the index, can be performed to find a lock. When the lock is found, the memory controller can store the memory request in a buffer that corresponds to the lock. In response to a signal to clear the lock, the memory controller removes the memory request from the buffer and performs the memory request.

30 Claims, 8 Drawing Sheets

MANAGING HAZARDS IN A MEMORY CONTROLLER

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets can be packaged together to facilitate interconnection with other components of a larger system. Each chiplet can include one or more individual integrated circuits (ICs), or "chips", potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics can be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. The illustrated chiplet system includes a memory controller and uses a packet-based network to communicate between chiplets. Details about example components and techniques implemented by the memory controller are provided below with respect to FIGS. 1-4. Because the chiplet memory controller or controllers that can receive packets from any number of chiplets based on the design of the chiplet system, an issue can arise to ensure atomicity in actions that the memory controller takes upon data when servicing requests. That is, the potential complexity of chiplet configurations enabled by the packet-based chiplet system described below can result in data integrity issues when, for example, traditional control structures are absent, as is often the case in chiplet systems.

To be "atomic" an action (e.g., memory update or write) is the only action that can use or modify a resource at any one time. Thus, the action exclusively modifies resources (e.g., data in memory). Thus, given two atomic actions with respect to the same resources, one action must begin and end before the second action can begin. Thus, atomic actions on shared resources need to be managed to ensure that the state of the resource is being accessed by a single activity at a time.

To manage resources of the memory controller that are shared, such as memory or computational components (e.g., cache line state, built-in atomic units, programmable atomic units, etc.) a hazard structure is used. The hazard structure leverages the fact that memory controller activities are invoked by memory requests to memory. Specifically, the memory requests involving the shared resources largely include at least one memory address to which the request applies. This memory address can be used as the basis of a control structure to determine whether a resource is being used or not.

Figure 4:
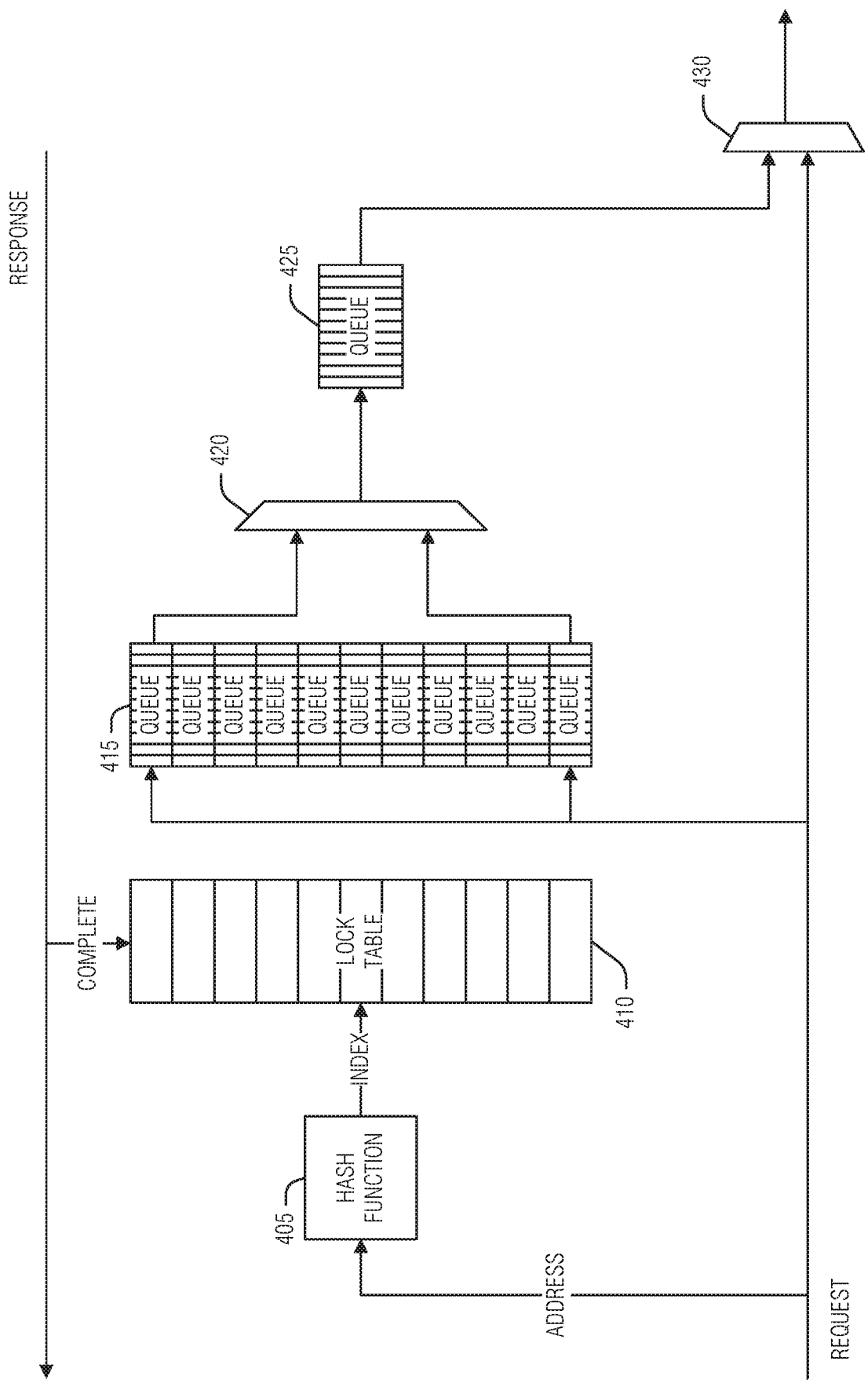
FIG. 4 illustrates a data flow through components to support hazard management, according to an embodiment.

For example, a data structure (e.g., table, array, etc.) can include a variety of entries referenced by an index (e.g., key). The value of the entry is a lock, perhaps represented as a bit (e.g., a logical one indicates that a resource is locked and a logical zero indicates that the resource is unlocked). The memory address can be manipulated, such as by hashing, to produce the index. When a request is received, the base memory address from the request is used to determine whether there is presently a lock in the data structure at the index derived from the base memory address. If there is a lock, then the request is queued and tied to the lock entry—an example of this structure is illustrated in FIG. 4. When a previous request for the same lock entry completes and clears the lock, then the oldest entry in the queue is allowed to proceed. Accordingly, the atomicity of a shared resource is managed. This is accomplished with a high throughput because a received request that observes a set lock entry does not stall subsequently received requests and ordering of received requests hashed to the individual lock entries is maintained. Additional details and examples are provided below.

Figure 1A:
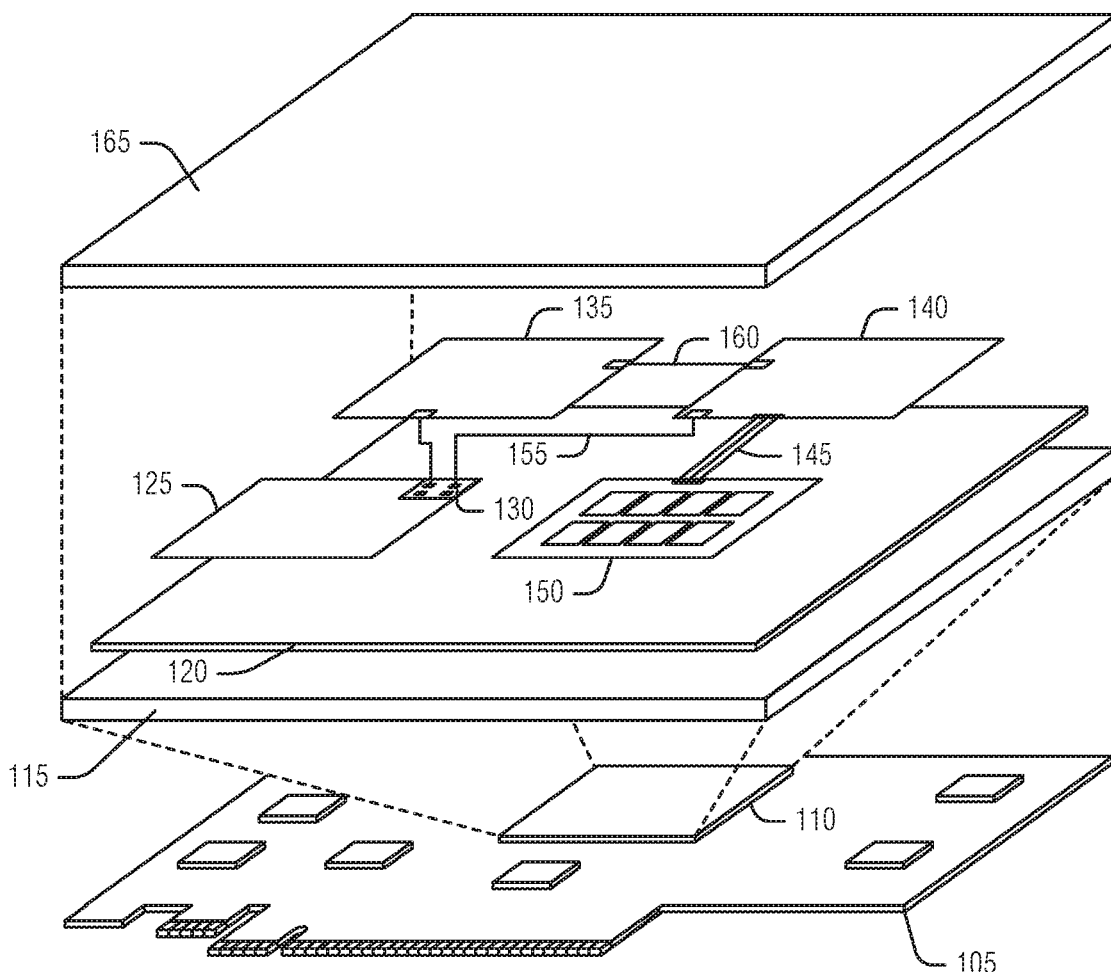
FIGS. 1A and 1B illustrate an example of a chiplet system, according to an embodiment.
Figure 1B:
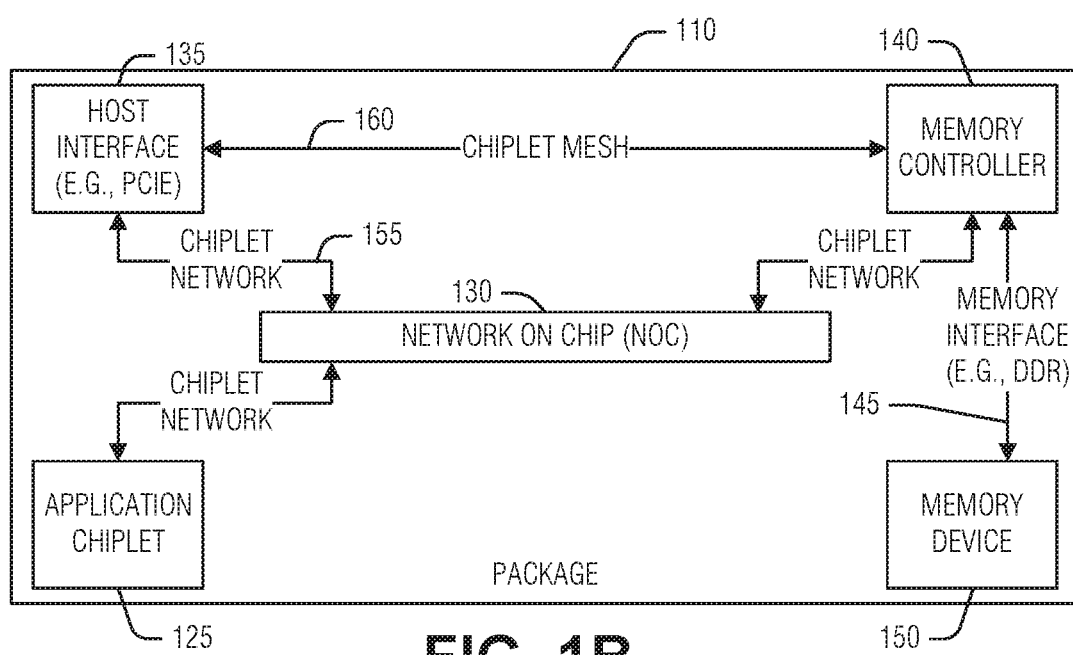

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems can include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 can be included on the application chiplet 125. In an example, NOC 130 can be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable.

SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface can be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operator execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 140. In other chiplet systems, the atomic operators can be performed by other chiplets. For example, an atomic operator of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operators avoid transmitting the data across the chiplet network 160, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)-such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets can be provided. In an example, these memory device chiplets can each implement one or multiple storage technologies. In an example, a memory chiplet can include, multiple stacked memory die of different technologies, for example one or more static random access memory (SRAM) devices stacked or otherwise in communication with one or more dynamic random access memory (DRAM) devices. Memory controller 140 can also serve to coordinate operations between multiple memory chiplets in chiplet system 110; for example, to utilize one or more memory chiplets in one or more levels of cache storage, and to use one or more additional memory chiplets as main memory. Chiplet system 110 can also include multiple memory controllers 140, as can be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
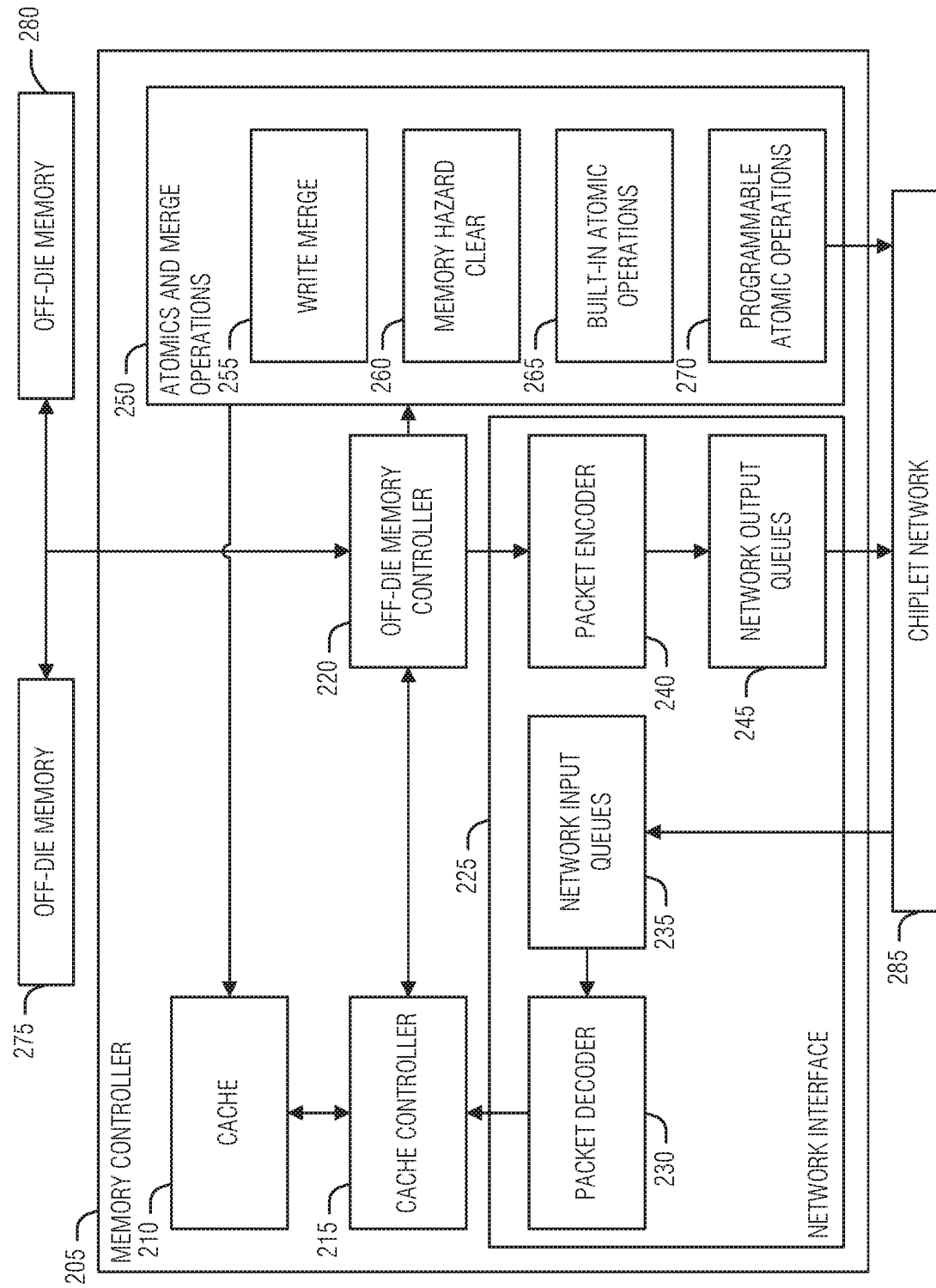
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples can be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and can be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache can also be implemented in off-die memories 275 or 280; and in some such examples can be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operator, the built-in atomic unit 265 receives the request and reads data, either from the write merge unit 255 or directly from the off-die memory controller 220. The atomic operator is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operators such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operator performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operators can also involve requests for a "standard" atomic operator on the requested data, such as comparatively simple, single cycle, integer atomics—such as fetch-and-increment or compare-and-swap—which will occur with the same throughput as a regular memory read or write operation not involving an atomic operator. For these operations, the cache controller 215 can generally reserve a cache line in the cache 210 by setting a hazard (in hardware), so that the cache line cannot be read by another process while it is in transition. An example of components and operations of the hazard mechanism can operate as described below with respect to FIGS. 3 (e.g., the Hazard block) and 4. The data is obtained from either the off-die memory 275 or the cache 210, and is provided to the built-in atomic unit 265 to perform the requested atomic operator. Following the atomic operator, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard which was set will be cleared by the memory hazard unit 260.

The PAU 270 enables high performance (high throughput and low latency) for programmable atomic operators (also referred to as "custom atomic transactions" or "custom atomic operators"), comparable to the performance of built-in atomic operators. Rather than executing multiple memory accesses, in response to an atomic operator request designating a programmable atomic operator and a memory address, circuitry in the memory controller chiplet 205 transfers the atomic operator request to PAU 270 and sets a hazard stored in a memory hazard register, for example, that corresponds to the memory address of the memory line used in the atomic operator to ensure that no other operation (read, write, or atomic) is performed on that memory line. The hazard is cleared upon completion of the atomic operator. Again, an example of components and operations of the hazard mechanism can operate as described below with respect to FIGS. 3 (e.g., the Hazard block) and 4. Additional, direct data paths provided for the PAU 270 executing the programmable atomic operators allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operators. When provided with the extended instruction set for executing programmable atomic operators, the PAU 270 can be embodied as one or more hybrid threading processors. In some example embodiments, the PAU 270 provides barrel-style, round-robin instantaneous thread switching to maintain a high instruction-per-clock rate.

Programmable atomic operators can be performed by the PAU 270 involving requests for a programmable atomic operator on the requested data. A user can prepare programming code to provide such programmable atomic operators. For example, the programmable atomic operators can be comparatively simple, multi-cycle operations such as floating-point addition, or comparatively complex, multi-instruction operations such as a Bloom filter insert. The programmable atomic operators can be the same as or different than the predetermined atomic operators, insofar as they are defined by the user rather than a system vendor. For these operations, the cache controller 215 can reserve a cache line in the cache 210, by setting a hazard, so that cache line cannot be read by another process while it is in transition. The data is obtained from either the cache 210 or the off-die memories 275 or 280, and is provided to the PAU 270 to perform the requested programmable atomic operator. Following the atomic operator, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard which was set will be cleared by the cache control circuit 215.

In selected examples, the approach taken for programmable atomic operators is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operator; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the hazard is set for the reserved cache line is to be cleared, by the memory hazard clear unit 260 (e.g., Hazard Clear block 365). Accordingly, when the request and read data is received by the write merge unit 255, a reset or clear signal can be transmitted by the memory hazard clear unit 260 to the cache 210 to reset the set memory hazard for the reserved cache line. Also, resetting this hazard will also release a pending read or write request involving the designated (or reserved) cache line, providing the pending read or write request to an inbound request multiplexer for selection and processing.

Figure 3:
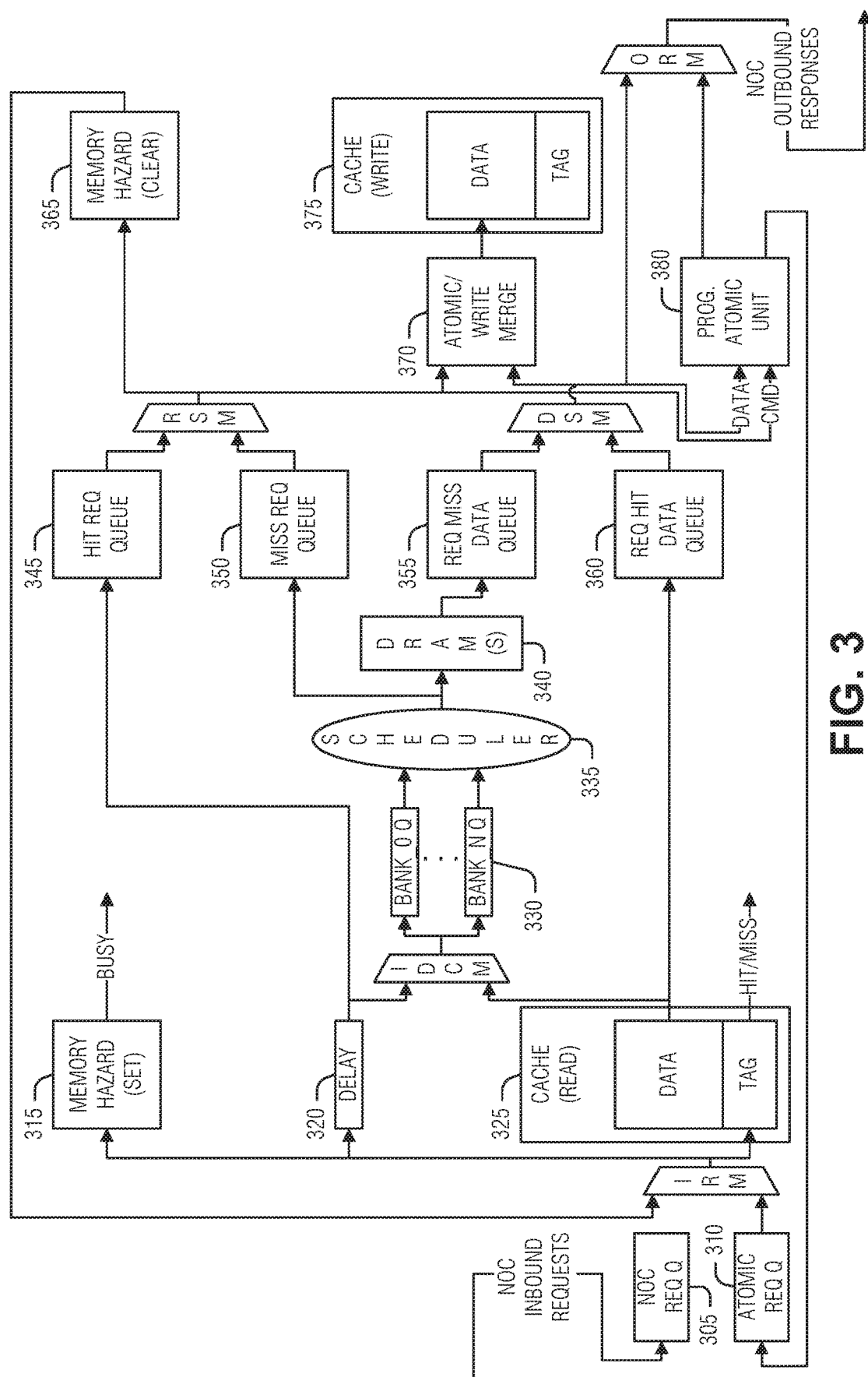
FIG. 3 illustrates components of an example of a memory controller chiplet, according to an embodiment.

FIG. 3 illustrates components of an example of a memory controller chiplet, according to an embodiment. FIG. 3 is another representation of a memory controller from the memory controller 205 illustrated in FIG. 2. Many of the same components shown in FIG. 2 are illustrated here. For example, the cache 302 and 385 are examples of cache 210; DRAM(s) 340 are examples of off-die memory 275-280; atomic/write merge 370 and the programmable atomic unit 380 may be an example of atomics and merge unit 250. Other components of FIG. 3 may be examples of other components of FIG. 2 such as off-die memory controller 220 and cache controller 215.

Other components, not specifically represented in the memory controller 205, can include the following. A NOC Request Queue 305 to receive requests from the network-on-chip and provide a small amount of queuing. An Atomic Request Queue 310 that receives requests from the programmable atomic unit 380 and provides a small amount of queuing. An Inbound Request Multiplexer (IRM) that selects between inbound memory request sources. In an example, the three memory request sources, in order of priority are: Memory Hazard Requests, Atomic Requests, and Inbound NOC Requests.

The Cache (Read) 325 and Cache (Write) 375 are a single device implemented as, in an example, an SRAM data cache. The diagram illustrates the cache as two separate blocks (325 and 375), one providing read access, the other providing write access. A Delay block 320 provides one or more pipeline stages to mimic the delay for an SRAM cache read operation. Generally, a cache miss accesses to the off-die memory 340 (e.g., off-die memory 280) to bring the desired data into the cache. While waiting for the memory response (e.g., access time for the DRAM 340), the memory line is not available for other requests.

A Memory Hazard block (Hazard Set block 315 and Hazard Clear block 365) can maintain a table of hazards indicating which shared resources of the memory controller-such as memory lines, cache lines, PAU operations, etc.)—are free or unavailable because they are already in use. Thus, the Memory Hazard block operates to ensure atomicity of requests though exclusive access to shared resources. For example, an inbound request that tries to access a shared resource with a hazard is held by the Memory Hazard block until the hazard is cleared. Once the hazard is cleared then the request can proceed (e.g., the request can be resent through the Inbound Request Multiplexer). In an example, the hazards for resources are based on (e.g., identified by, linked to, etc.) a memory address present in the request. Such an addressed-based hazard mechanism leverages the presence of the memory address in requests to the memory controller and the usual correspondence of such physical memory addresses and hardware within the memory controller.

The Memory Hazard block (e.g., Hazard Set block 315) is configured to receive a memory request. This memory request includes a base memory address. Here, the term "base memory address" refers to one memory address in the memory request if more than one memory address is specified. The selection of the one memory address is a design decision, but the selection is not variable. Thus, if the base memory address is the lower bound of a range specified by two memory address in the memory request, then the base memory address is always the lower bound. In an example, the memory request is for data in a memory managed by a memory controller. The issue is consistency, such that the single base memory address is the same across multiple memory requests for the same shared resources.

In an example, the request is received via the NOC as a CPI request, such as the CPI request 500 described below with respect to FIG. 5. In an example, the memory request is for a computation component, such as a cryptographic unit (not shown), a built-in atomic unit (e.g., built-in atomic unit 265), or the PAU 380. In an example, the memory request is in the form of a CPI request, such as the CPI request 500 of FIG. 5.

The Memory Hazard block is configured to compute an index from the base memory address. In an example, the index is computed from the base memory address by hashing the base memory address. Hashing the base memory address converts the base memory address into a consistent representation that is generally more condensed that the base memory address. The hashing technique, such as the number of output bits that are produced, can be adjusted based on contention for resources. Generally, the fewer bits in the output hash, the more likely that a collision occurs. Here a collision occurs when two different memory addresses are hashed and produce the same output. Thus, when contention is low, fewer bits can be used for the hash resulting in greater economy of hardware to support the mechanism. Conversely, when contention is high, there is a greater likelihood of a collision and more bits can be used for the hash.

The Memory Hazard block is configured to perform a lookup using the index to find a lock. Here, the lookup is performed against a data structure with entries. The value in the entry indicates whether or not there is a lock and the index is used to uniquely identify an entry. Thus, in an example, to perform the lookup using the index, the entry in the data structure that corresponds to the index is obtained (e.g., retrieved). In an example, the data structure is an array. In this example, the base memory address is hashed to an integer number that corresponds to an entry of the array. Thus, the memory address is hashed to an index of the array. In this example, the lock value is held in the array at the index.

In an example, the data structure has fewer entries than base memory addresses in an addressable space for the memory controller. This example demonstrates the power in using a hash of the base memory address rather than the base memory address itself. Generally, it is unlikely that all memory addresses in the memory controller will be subject to simultaneous requests. If the memory address were used directly, the data structure would likely maintain many entries that are frequently unused. This results in wasted hardware resources dedicated to maintaining lock values that are rarely consulted. In this example, a fewer number of data structure entries are used than all possible memory addresses, reducing the amount of hardware used to locks. As noted above, the number of bits of the hash—and thus the number of data structure entries—can be tailored to control collisions. Generally, the smaller the lock value data structure, the greater chance that any two memory requests will collide. Thus, a smaller data structure is hardware efficient but can result in greater collisions (e.g., contention) and reduce throughput.

In an example, the lock is represented by a single bit, such as a logical one meaning that the shared resource is locked and a logical zero meaning that the resources are unlocked. While using a single bit for the lock can be efficient, other techniques can also be used. For example, as noted below and illustrated in FIG. 4, a buffer (e.g., a queue) can be linked to the lock to hold requests waiting for the shared resource to be free. Here, the mere presence of requests in the buffer can be used as the lock value, the buffer being the entry in the data structure and identified by the hash, if the request at the head of the buffer is not removed until after it completes.

The Memory Hazard block is configured to store the memory request in a buffer in response to finding the lock. Thus, when the memory address is converted into the index, and the index is used to retrieve an entry in the data structure, the entry indicates whether or not there is a lock. When there is a lock, the memory request cannot proceed because the shared resource is already in use. The memory request is then held in the buffer to await the completion of the operation that is using the shared resource. Storing the memory request in the buffer means that whatever portion of the memory request that would have been passed into the scheduler 335, for example, is stored. Thus, although the memory request upon receipt at the memory controller can include packet information to transit a chiplet network, if that information is not needed to perform the memory request, then it can be excluded from the buffer. Similarly, storing the memory request into the buffer can include storing a key for the memory request, where the data of the memory request is held at another component (e.g., a different buffer) in the memory controller. This technique can reduce the amount of data that is copied, for example, as the memory request moves through the buffer. In any example, the storage of the memory request maintains order between different memory requests, arriving at different times (with possibly different quality of server (QoS) values).

In an example, the buffer is one of several buffers. Here, the buffer to which the memory request is stored is the only one of the several buffers that corresponds to the lock and the other buffers respectively correspond to other possible locks. Thus, each buffer uniquely corresponds to one possible lock, linking the buffers and the possible locks. While a single buffer could be used, additional meta data would likely be needed to ensure that a next memory request for a freed shared resource does not wait on another memory request waiting for a still locked shared resource. Separate buffers for each index in the data structure provides a straightforward technique to avoid such issues.

The Memory Hazard block is configured to remove the memory request from the buffer when a signal to clear the lock is received. This signal can include an indication (e.g., interrupt, state register setting, etc.) that the memory request that caused the lock has completed, actual setting of the lock (e.g., from a logical one to a logical zero), a request to clear the lock, among other things. Thus, when the lock is cleared, the next memory request in the buffer can be removed and performed by the memory controller.

In an example, removing the memory request from the buffer includes selecting the buffer from multiple of the several buffers by an arbiter. This example contemplates the simultaneous (e.g., on a same clock cycle or during a window of time such as a scheduling interval) freeing of multiple locks upon which memory requests are waiting. Thus, the arbiter uses a technique, such as a round-robin selection, to choose which of the buffered memory requests will be removed and passed down the processing pipeline for the memory controller. In an example, selections of the arbiter are placed in a queue. This queue is an output queue from which the memory controller pipeline can select a next waiting request to process. In an example, the memory request is removed from the queue in response to an absence of a memory request that had no lock. This example notes a design choice in which a non-block memory request is processed with priority over a block memory request during a given scheduling interval. Although this can possibly lead to increased latencies for memory requests with contention, this arrangement eliminates the need to buffer memory requests not subject to a lock. An example of this arrangement is illustrated in FIG. 4.

The memory controller is configured to perform the memory request after removal from the buffer. Here, the memory request has a right to the shared resource over other memory requests. Thus, once removed from the buffer, the memory request proceeds down the memory controller processing pipeline to completion.

In an example, the Memory Hazard block is configured to set the lock as part of performing the memory request. Thus, as the memory request proceeds down the processing pipeline, the lock is set to ensure that no following memory request for the same shared resources is scheduled until the memory request completes. Setting the lock value generally occurs before the memory request is passed down the pipeline to ensure that there are no race conditions. Accordingly, as soon as the lock value is verified to indicate that there is no lock, the lock value is set on behalf of the memory request.

An Inbound DRAM Control Multiplexer (IDCM) selects from an inbound NOC request and a cache eviction request. For the Bank Request Queues 330, each separately managed DRAM bank has a dedicated bank request queue to hold requests until they can be scheduled on the associated DRAM bank.

The scheduler 335 selects across the bank request queues 335 to choose a request for an available DRAM bank. A Request Hit Data Queue 360 holds request data from cache hits until selected. A Request Miss Data Queue 355 holds data read from the DRAM(s) until selected. A Miss Request Queue 350 is used to hold request packet information for cache misses until the request is selected. A Hit Request Queue 345 holds request packet information for cache hits until selected. A Data Selection Multiplexer (DSM) selects between DRAM read data and cache hit read data. The selected data is written to the SRAM cache. Request Selection Multiplexer (RSM) selects between hit and miss request queues 345 and 355.

The Atomic/Write Merge 370 either merges the request data and DRAM read data, or, if the request is a built-in atomic (e.g., built-in atomic operation block 265), the memory data and request data are used as inputs for an atomic operation. The Cache (Write) block 375 represents the write port for the SRAM cache. Data from a NOC write request and data from DRAM read operations are written to the SRAM cache. The Memory Hazard (Clear) block 365 represents the hazard clear operation for the memory hazard structure. Clearing a hazard may release a pending NOC request and send it to the Inbound Request Multiplexer. The programmable Atomic Unit 380 processes programmable atomic operations (e.g., transactions). The NOC Outbound Response Multiplexer (ORM) selects between memory controller responses and custom atomic unit responses and sends the selection to the NOC.

FIG. 4 illustrates a data flow through components to support hazard management, according to an embodiment. These components can include circuitry to perform a hash (hash block 405) on an address in a memory request. In an example, the hash block 405 can be replaced or supplemented by other computation units that transform the address in the memory request to a suitable form for the lock table 410, collectively referred to as a transform circuitry. The components also include a lock table 410 data structure, a linked queue 415 data structure, an arbiter 420, an output queue 425 data structure, and an output multiplexer 430. The data structures are implemented in circuitry, such as by a RAM device, flip-flop registers, etc. These components can be included in any device for which address-based resource locking is desired, such as a memory controller (e.g., memory controller 140 of FIG. 1, memory controller 205 of FIG. 2, Hazard block in the memory controller of FIG. 3, etc.) or a PAU (e.g., PAU 270 of FIG. 2, PAU 380 of FIG. 3, etc.), among others.

As illustrated, the address (e.g., base memory address) of the request is provided to a hash unit 405 to compute and index. The index uniquely corresponds to an entry in the lock table 410. If there is no lock at the entry, the lock is set at the entry and the request proceeds to the multiplexer 430 and then down the processing pipeline. Here, the request for which no lock is present upon the request's arrival is given priority by the multiplexer.

If there is a lock at the entry in the lock table 410, then the request is buffered in the queue 415 that corresponds to the lock table entry (and hence the index from the hash unit 405). The queue 415 can be implemented as a first-in-first-out (FIFO), ensuring that arrival order of buffered memory requests is maintained. When a response signals that the lock corresponding to the index of the base memory address of the request that resulted in the response should be cleared, the head of the queue 415 corresponding to that index can be removed by the arbiter 420. In an example, lock entry can be modified (e.g., cleared) to provoke the dequeuing of the next memory request. In an example, the signal can provoke the dequeuing without modifying the lock entry.

The arbiter 420 addresses situations in which multiple locks are cleared, and thus multiple memory requests can be dequeued. Here, the arbiter selects from the multiple available memory requests. This selection can take many forms, such as a round-robin selection of the queues.

The arbiter 420 provides the selected memory request to an output queue 425. At each scheduling interval, the multiplexer 430 removes a next memory request from the output queue 425 when there are no passthrough memory requests. Again, this configuration of the multiplexer prioritizes the passthrough, or contention free, memory request over memory requests that had contention on a shared resource when they arrived.

Figure 5:
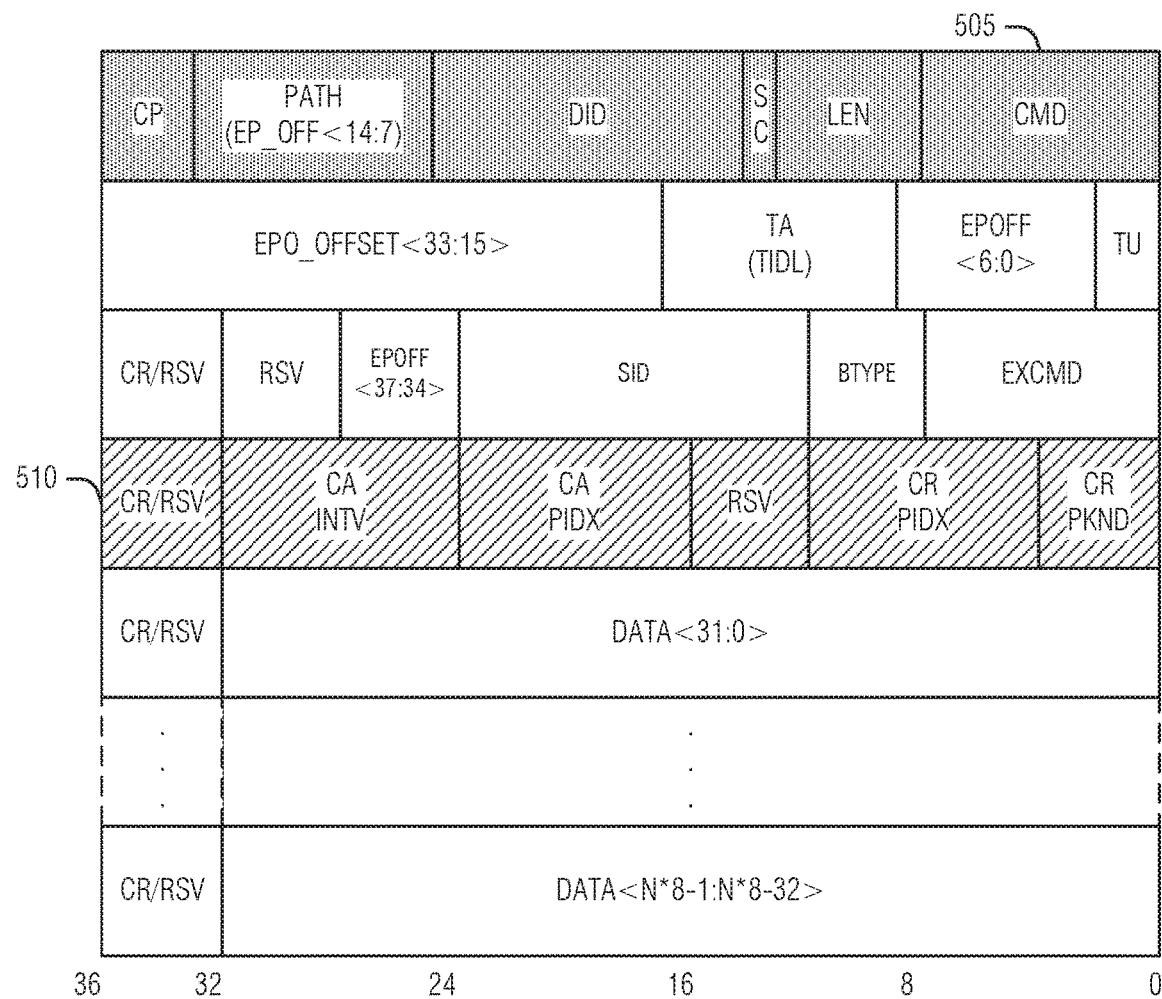
FIG. 5 illustrates a chiplet protocol interface request packet, according to an embodiment.

FIG. 5 illustrates a chiplet protocol interface request packet 500, according to an embodiment. The following is a table for an example of CPI field descriptions and bit lengths corresponding to the CPI request packet 500.

| Field Name | Field Width | Value | Field Description |
|---|---|---|---|
| | | Line 1 | |
| CMD | 8 | 126 | Extended virtual channel 1 (VC1) |
| LEN | 5 | | Packet Length |
| SC | 1 | 0 | Sequence Continue (ignored for external memory device (EMD)) |
| DID | 12 | | Destination NOC endpoint |
| Path | 8 | | Endpoint offset <14:7> |
| CP | 2 | 1 | Credit/Path Order (Credit Return enabled in flits 3-N and PATH field based path ordering) |
| | | Line 2 | |
| TU | 2 | | Transaction ID <9:8> |
| EPOff <6:0> | 7 | | Endpoint Offset <6:0> |
| | | Line 3 | |
| TA | 8 | | Transaction IS <7:0> |
| EpOffset <33:15> | 19 | | Endpoint Offset <33:15> |
| | | Line 4 | |
| EXCMD | 8 | | Extended Command |
| BTYPE | 4 | 8 | BTYPE of 8 is EMD vendor defined |
| SID | 12 | | Source NOC Endpoint |
| EpOffset <37:34> | 4 | | Endpoint Offset <37:34> |
| RSV | 4 | 0 | Reserved |
| CR/RSV | 4 | | Credit Return |
| | | Lines 5 and Beyond | |
| CrPKnd | 4 | | Credit Pool Kind |
| CrPldx | 8 | | Credit Pool Index |
| RSV | 4 | 0 | Reserved |
| CaPldx | 8 | | Custom (Programmable) Atomic Partition Index |
| CaIntv | 8 | | Interleave Size |
| CR/RSV | 4 | | Credit Return |
| DATA | 32 | | Argument data: 0, 1, 2, or 4, 64-bit values |
| CR/RSV | 4 | | Credit Return |

As illustrated, line 4, the shaded line is an extended header 510. The command field 505 indicates that the request 500 is for a PAO. However, the entity decoding the request 500 and providing the PAO parameter to a PAU (e.g., PAU 270) will either pass the extended header 510 information to the PAU or decode the extended header 510 and provide the constituent fields as inputs to the PAU.

Figure 6:
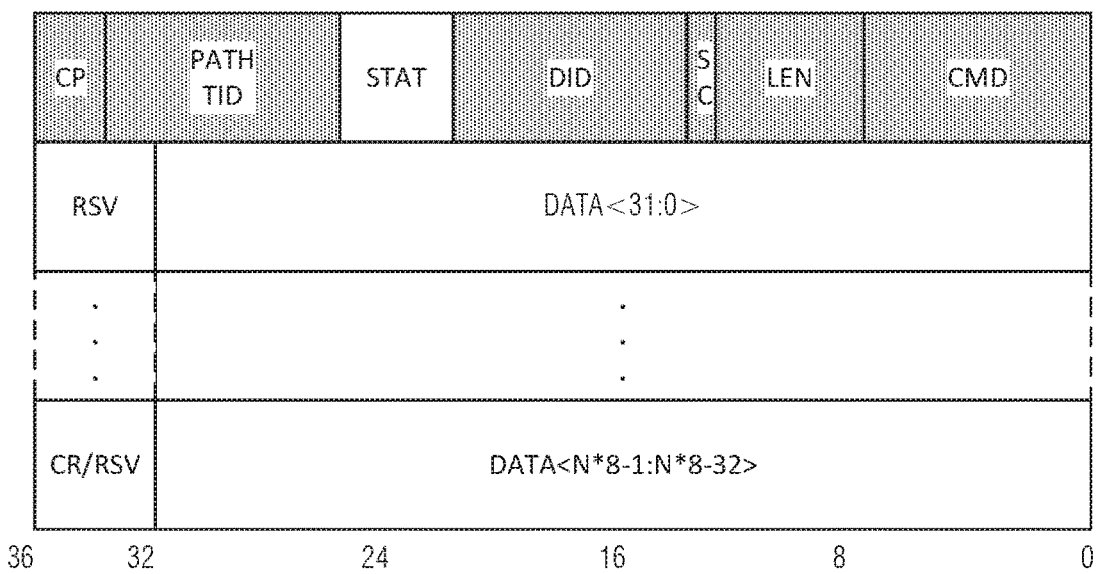
FIG. 6 illustrates a chiplet protocol interface response packet, according to an embodiment.

FIG. 6 illustrates a chiplet protocol interface response packet 600, according to an embodiment. The following is a table for an example of CPI field descriptions and bit lengths corresponding to the CPI response packet 600.

| Field Name | Field Width | Field Description |
|---|---|---|
| | Line 1 | |
| CMD | 8 | Packet command |
| LEN | 5 | Encoded packet Length |
| Sc | 1 | Sequence Continue. When set, this packet is part of a multi-packet transfer and this packet is not the last packet in the sequence. In an example, this bit is present in the first flit of all packet types. |
| DID | 8 | Destination NOC Endpoint ID bits <7:0> |
| STAT | 4 | Response Status |
| PATH | 8 | The PATH field used to specify a path |
| TID | | through a CPI fabric to force ordering between packets. For both CPI native and AXI over CPI, the read response packet's PATH field can contain a transaction identifier (TID) value. |
| CP | 2 | Credit Present/Path Ordering. The CP field contains an encoded value that specifies both whether the field CR of flits 3-N of the packet contains credit return information and whether path ordering is enabled. |
| | Lines 2 and beyond | |
| DATA | 32 | Read Response Data, bits N*8-1:0 |
| CR/RSV | 4 | Credit Return Information |
| RSV | 4 | Reserved |

Figure 7:
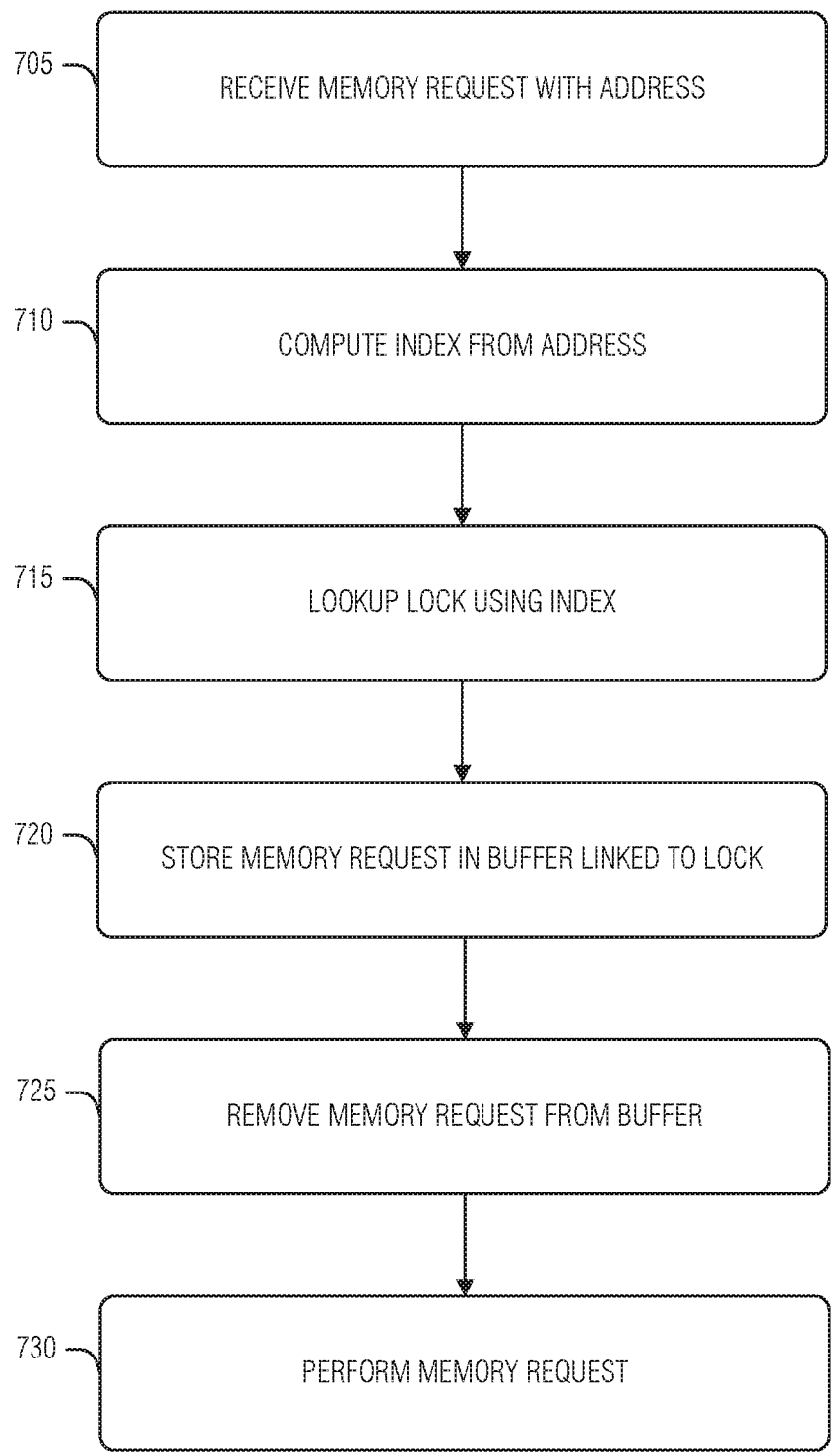
FIG. 7 is a flow chart of an example of a method for managing hazards in a memory controller, according to an embodiment.

FIG. 7 is a flow chart of an example of a method 700 for managing hazards in a memory controller, according to an embodiment. Operations of the method 700 are performed by computer hardware, such as that described with respect to FIG. 1 (e.g., the memory controller chiplet 140), FIG. 2, FIG. 3, or FIG. 8 (e.g., processing circuitry).

At operation 705, a memory request that includes a base memory address is received. In an example, the memory request is for data in a memory managed by a memory controller. In an example, the memory request is for a computation component, such as a cryptographic unit, a built-in atomic unit, or a PAU. In an example, the memory request is in the form of a CPI request, such as the CPI request 500 of FIG. 5.

At operation 710, an index is computed from the base memory address. In an example, the index is computed from the base memory address by hashing the base memory address.

At operation 715, a lookup is performed using the index to find a lock. In an example, the lock is represented by a single bit. In an example, to perform the lookup using the index, an entry in data structure that corresponds to the index is obtained. In an example, the data structure is an array. In an example, the data structure has fewer entries than base memory addresses in an addressable space for the memory controller.

At operation 720, the memory request is stored in a buffer in response to finding the lock. In an example, the buffer is one of several buffers. Here, the buffer to which the memory request is stored is the only one of the several buffers that corresponds to the lock and the other buffers respectively correspond to other possible locks. Thus, each buffer uniquely corresponds to one possible lock, linking the buffers and the possible locks.

At operation 725, the memory request is removed from the buffer in response to a signal to clear the lock. In an example, removing the memory request from the buffer includes selecting the buffer from multiple of the several buffers by an arbiter. In an example, selections of the arbiter are placed in a queue. In an example, the memory request is removed from the queue in response to an absence of a memory request that had no lock.

At operation 730, performing the memory request after removal from the buffer. In an example, performing the memory request includes setting the lock.

Figure 8:
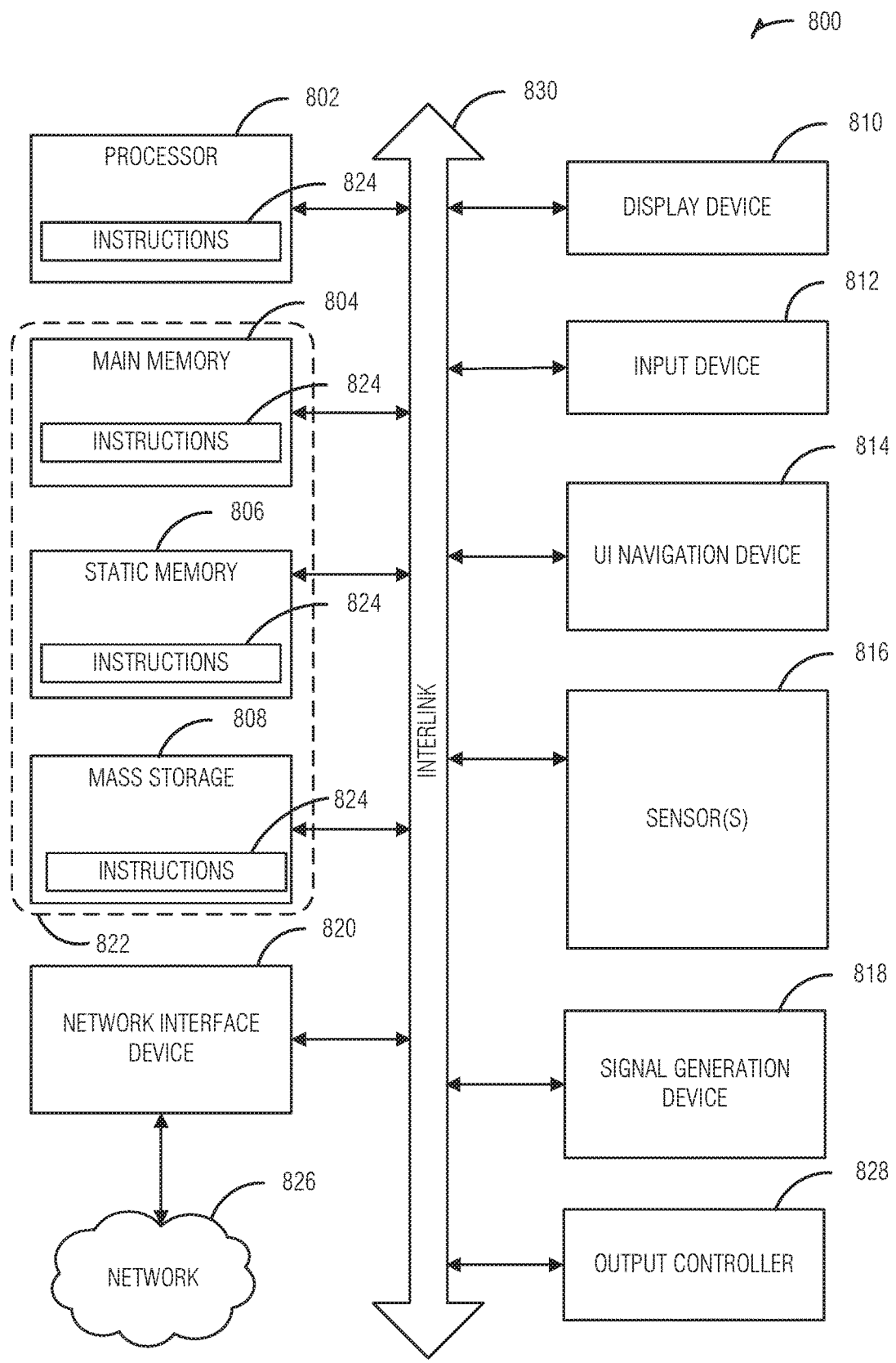
FIG. 8 is a block diagram of an example of a machine with which, in which, or by which embodiments of the present disclosure can operate.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine readable media 822. While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Example 1 is a memory controller comprising: an interface configured to receive a memory request that includes a base memory address; transform circuitry configured to compute an index from the base memory address; a lock table data structure configured to perform a lookup using the index to find a lock; a buffer configured to store the memory request in response to finding the lock, the buffer being one of several buffers, the buffer being the only one of the several buffers that corresponds to the lock, other buffers of the several buffers respectively corresponding to other possible locks; an arbiter configured to remove the memory request from the buffer in response to a signal to clear the lock; and a processing pipeline configured to perform the memory request after removal from the buffer.

In Example 2, the subject matter of Example 1, wherein, to compute the index from the base memory address, the transform circuitry is configured to hash the base memory address.

In Example 3, the subject matter of Example 2, wherein, to perform the lookup using the index, the lock table data structure returns an entry in an array that corresponds to the index.

In Example 4, the subject matter of any of Examples 2-3, wherein the lock table data structure has fewer entries than base memory addresses in an addressable space for the memory controller.

In Example 5, the subject matter of any of Examples 2-4, wherein the lock is represented by a single bit.

In Example 6, the subject matter of any of Examples 1-5, wherein, to remove the memory request from the buffer, the arbiter is configured to select the buffer from multiple of the several buffers.

In Example 7, the subject matter of Example 6, wherein selections of the arbiter are placed in a queue.

In Example 8, the subject matter of Example 7, wherein the memory request is removed from the queue in response to an absence of a memory request that had no lock.

In Example 9, the subject matter of any of Examples 1-8, wherein, to perform the memory request, the processing pipeline is configured to set the lock.

In Example 10, the subject matter of any of Examples 1-9, wherein the memory controller is a chiplet in a chiplet system.

Example 11 is a method comprising: receiving, at a memory controller, a memory request that includes a base memory address; computing an index from the base memory address; performing a lookup using the index to find a lock; storing the memory request in a buffer in response to finding the lock, the buffer being one of several buffers, the buffer being the only one of the several buffers that corresponds to the lock, other buffers of the several buffers respectively corresponding to other possible locks; removing the memory request from the buffer in response to a signal to clear the lock; and performing the memory request after removal from the buffer.

In Example 12, the subject matter of Example 11, wherein computing the index from the base memory address includes hashing the base memory address.

In Example 13, the subject matter of Example 12, wherein performing the lookup using the index includes obtaining an entry in an array that corresponds to the index.

In Example 14, the subject matter of any of Examples 12-13, wherein the lookup is performed on a data structure that has fewer entries than base memory addresses in an addressable space for the memory controller.

In Example 15, the subject matter of any of Examples 12-14, wherein the lock is represented by a single bit.

In Example 16, the subject matter of any of Examples 11-15, wherein removing the memory request from the buffer includes selecting the buffer from multiple of the several buffers by an arbiter.

In Example 17, the subject matter of Example 16, wherein selections of the arbiter are placed in a queue.

In Example 18, the subject matter of Example 17, wherein the memory request is removed from the queue in response to an absence of a memory request that had no lock.

In Example 19, the subject matter of any of Examples 11-18, wherein performing the memory request includes setting the lock.

In Example 20, the subject matter of any of Examples 11-19, wherein the memory controller is a chiplet in a chiplet system.

Example 21 is a machine-readable medium including instructions that, when executed by circuitry of a memory controller, cause the memory controller to perform operations: receiving a memory request that includes a base memory address; computing an index from the base memory address; performing a lookup using the index to find a lock; storing the memory request in a buffer in response to finding the lock, the buffer being one of several buffers, the buffer being the only one of the several buffers that corresponds to the lock, other buffers of the several buffers respectively corresponding to other possible locks; removing the memory request from the buffer in response to a signal to clear the lock; and performing the memory request after removal from the buffer.

In Example 22, the subject matter of Example 21, wherein computing the index from the base memory address includes hashing the base memory address.

In Example 23, the subject matter of Example 22, wherein performing the lookup using the index includes obtaining an entry in an array that corresponds to the index.

In Example 24, the subject matter of any of Examples 22-23, wherein the lookup is performed on a data structure that has fewer entries than base memory addresses in an addressable space for the memory controller.

In Example 25, the subject matter of any of Examples 22-24, wherein the lock is represented by a single bit.

In Example 26, the subject matter of any of Examples 21-25, wherein removing the memory request from the buffer includes selecting the buffer from multiple of the several buffers by an arbiter.

In Example 27, the subject matter of Example 26, wherein selections of the arbiter are placed in a queue.

In Example 28, the subject matter of Example 27, wherein the memory request is removed from the queue in response to an absence of a memory request that had no lock.

In Example 29, the subject matter of any of Examples 21-28, wherein performing the memory request includes setting the lock.

In Example 30, the subject matter of any of Examples 21-29, wherein the memory controller is a chiplet in a chiplet system.

Example 31 is a system comprising: means for receiving, at a memory controller, a memory request that includes a base memory address; means for computing an index from the base memory address; means for means for storing the memory request in a buffer in response to finding the lock, the buffer being one of several buffers, the buffer being the only one of the several buffers that corresponds to the lock, other buffers of the several buffers respectively corresponding to other possible locks; means for removing the memory request from the buffer in response to a signal to clear the lock; and means for performing the memory request after removal from the buffer.

In Example 32, the subject matter of Example 31, wherein the means for computing the index from the base memory address include means for hashing the base memory address.

In Example 33, the subject matter of Example 32, wherein the means for performing the lookup using the index include means for obtaining an entry in an array that corresponds to the index.

In Example 34, the subject matter of any of Examples 32-33, wherein the lookup is performed on a data structure that has fewer entries than base memory addresses in an addressable space for the memory controller.

In Example 35, the subject matter of any of Examples 32-34, wherein the lock is represented by a single bit.

In Example 36, the subject matter of any of Examples 31-35, wherein the means for removing the memory request from the buffer include means for selecting the buffer from multiple of the several buffers by an arbiter.

In Example 37, the subject matter of Example 36, wherein selections of the arbiter are placed in a queue.

In Example 38, the subject matter of Example 37, wherein the memory request is removed from the queue in response to an absence of a memory request that had no lock.

In Example 39, the subject matter of any of Examples 31-38, wherein the means for performing the memory request include means for setting the lock.

In Example 40, the subject matter of any of Examples 31-39, wherein the memory controller is a chiplet in a chiplet system.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   an interface couplable to a host or a chiplet in a chiplet system and configured to receive a memory request that includes a base memory address;
   transform circuitry configured to compute an index from the base memory address;
   hardware to implement a lock table data structure configured to perform a lookup using the index to find a lock;
   a memory to implement a buffer configured to store the memory request in response to finding the lock, the buffer being one of several buffers, the buffer being the only one of the several buffers that corresponds to the lock, other buffers of the several buffers respectively corresponding to other possible locks;
   an arbiter configured to remove the memory request from the buffer in response to a signal to clear the lock; and
   a processing pipeline configured to perform the memory request after removal from the buffer.

2. The apparatus of claim 1, wherein, to compute the index from the base memory address, the transform circuitry is configured to hash the base memory address.

3. The apparatus of claim 2, wherein, to perform the lookup using the index, the lock table data structure returns an entry in an array that corresponds to the index.

4. The apparatus of claim 2, wherein the lock table data structure has fewer entries than base memory addresses in an addressable space for the apparatus.

5. The apparatus of claim 2, wherein the lock is represented by a single bit.

6. The apparatus of claim 1, wherein, to remove the memory request from the buffer, the arbiter is configured to select the buffer from multiple of the several buffers.

7. The apparatus of claim 6, wherein selections of the arbiter are placed in a queue.

8. The apparatus of claim 7, wherein the memory request is removed from the queue in response to an absence of a memory request that had no lock.

9. The apparatus of claim 1, wherein, to perform the memory request, the processing pipeline is configured to set the lock.

10. The apparatus of claim 1, wherein the apparatus is the chiplet in a chiplet system.

11. A method comprising:
    receiving, at a memory controller, a memory request that includes a base memory address;
    computing an index from the base memory address;
    performing a lookup using the index to find a lock;
    storing the memory request in a buffer in response to finding the lock, the buffer being one of several buffers, the buffer being the only one of the several buffers that corresponds to the lock, other buffers of the several buffers respectively corresponding to other possible locks;
    removing the memory request from the buffer in response to a signal to clear the lock; and
    performing the memory request after removal from the buffer.

12. The method of claim 11, wherein computing the index from the base memory address includes hashing the base memory address.

13. The method of claim 12, wherein performing the lookup using the index includes obtaining an entry in an array that corresponds to the index.

14. The method of claim 12, wherein the lookup is performed on a data structure that has fewer entries than base memory addresses in an addressable space for the memory controller.

15. The method of claim 12, wherein the lock is represented by a single bit.

16. The method of claim 11, wherein removing the memory request from the buffer includes selecting the buffer from multiple of the several buffers by an arbiter.

17. The method of claim 16, wherein selections of the arbiter are placed in a queue.

18. The method of claim 17, wherein the memory request is removed from the queue in response to an absence of a memory request that had no lock.

19. The method of claim 11, wherein performing the memory request includes setting the lock.

20. The method of claim 11, wherein the memory controller is a chiplet in a chiplet system.

21. A non-transitory machine-readable medium including instructions that, when executed by circuitry of a memory controller, cause the memory controller to perform operations:
- receiving a memory request that includes a base memory address;
- computing an index from the base memory address;
- performing a lookup using the index to find a lock;
- storing the memory request in a buffer in response to finding the lock, the buffer being one of several buffers, the buffer being the only one of the several buffers that corresponds to the lock, other buffers of the several buffers respectively corresponding to other possible locks;
- removing the memory request from the buffer in response to a signal to clear the lock; and
- performing the memory request after removal from the buffer.

22. The method of claim 21, wherein computing the index from the base memory address includes hashing the base memory address.

23. The method of claim 22, wherein performing the lookup using the index includes obtaining an entry in an array that corresponds to the index.

24. The method of claim 22, wherein the lookup is performed on a data structure that has fewer entries than base memory addresses in an addressable space for the memory controller.

25. The method of claim 22, wherein the lock is represented by a single bit.

26. The method of claim 21, wherein removing the memory request from the buffer includes selecting the buffer from multiple of the several buffers by an arbiter.

27. The method of claim 26, wherein selections of the arbiter are placed in a queue.

28. The method of claim 27, wherein the memory request is removed from the queue in response to an absence of a memory request that had no lock.

29. The method of claim 21, wherein performing the memory request includes setting the lock.

30. The method of claim 21, wherein the memory controller is a chiplet in a chiplet system.

\* \* \* \* \*